(12) United States Patent
Whitehill et al.

(10) Patent No.: US 9,105,119 B2
(45) Date of Patent: Aug. 11, 2015

(54) ANONYMIZATION OF FACIAL EXPRESSIONS

(71) Applicant: Machine Perception Technologies Inc., San Diego, CA (US)

(72) Inventors: Jacob Whitehill, Cambridge, MA (US); Javier R. Movellan, La Jolla, CA (US); Ian Fasel, San Diego, CA (US)

(73) Assignee: Emotient, Inc., San Diego, CA (US)

( * ) Notice: Subject to any disclaimer, the term of this patent is extended or adjusted under 35 U.S.C. 154(b) by 69 days.

(21) Appl. No.: 13/886,193

(22) Filed: May 2, 2013

(65) Prior Publication Data

US 2014/0328547 A1 Nov. 6, 2014

(51) Int. Cl.
*G06K 9/36* (2006.01)
*G06T 11/00* (2006.01)
*G06K 9/00* (2006.01)

(52) U.S. Cl.
CPC .. *G06T 11/00* (2013.01); *G06K 9/00* (2013.01)

(58) Field of Classification Search
CPC . G06K 9/00; G06K 9/00288; H04N 1/00209; H04N 1/00244; H04N 1/00307; H04M 1/72555
USPC ......... 382/118, 162, 165, 276, 190, 159, 239, 382/203; 348/222.1; 455/556.1
See application file for complete search history.

(56) References Cited

U.S. PATENT DOCUMENTS

| 7,095,878 B1 * | 8/2006 | Taylor et al. .................. 382/118 |
| 7,187,786 B2 * | 3/2007 | Kee ................................ 382/118 |
| 2004/0095344 A1 * | 5/2004 | Dojyun et al. ................ 345/419 |
| 2010/0086215 A1 | 4/2010 | Bartlett et al. |

* cited by examiner

*Primary Examiner* — Ali Bayat
(74) *Attorney, Agent, or Firm* — Fenwick & West LLP (57) ABSTRACT

A method facilitates training of an automatic facial expression recognition system through distributed anonymization of facial images, thereby allowing people to submit their own facial images without divulging their identities. Original facial images are accessed and perturbed to generate synthesized facial images. Personal identities contained in the original facial images are no longer discernable from the synthesized facial images. At the same time, each synthesized facial image preserves at least part of the emotional expression contained in the corresponding original facial image.

52 Claims, 6 Drawing Sheets

ANONYMIZATION OF FACIAL EXPRESSIONS

BACKGROUND OF THE INVENTION

1. Field of the Invention

This invention relates generally to anonymization of facial images, for example as may be used to develop training sets for machine learning.

2. Description of the Related Art

A facial expression is a visible manifestation of the affective state, cognitive activity, intention, personality, and/or psychopathology of a person. Facial expressions convey non-verbal communication cues in face-to-face interactions. These cues may also complement speech by helping the listener to elicit the intended meaning of spoken words. As a consequence of the information they carry, facial expressions not only help in interpersonal communications but also play an important role whenever humans interact with machines.

Automatic recognition of facial expressions may act as a component of natural human-machine interfaces. Such interfaces could enable the automated provision of services that require a good appreciation of the emotional state of the person receiving the services, as would be the case in transactions that involve negotiations. Some robots can also benefit from the ability to recognize facial expressions. Automated analysis of facial expressions for behavior science or medicine is another possible application domain.

One approach for developing automatic facial expression recognition systems relies on supervised machine learning using training sets. Training sets typically include facial images of human subjects and corresponding labels for the facial expression (e.g., whether the human subject is happy, sad, angry, surprised, etc.). Many examples from a wide range of human subjects (e.g., male, female, old, young, Asian, Caucasian, etc.) and different image rendering conditions (e.g., different cameras, different types of illumination, etc.) are desirable to train an AFER system to work reliably.

One way to obtain a large number of examples is to search the internet. However, many internet databases have pictures only of a certain group of similar-looking people (e.g., young female Caucasians), and using these examples as input to train an AFER system may result in overfitting. Moreover, the majority of the images found on the internet are unlabeled (i.e., without a facial expression category label), and labeling these images can be very labor-intensive and time-consuming. An alternative way to obtain examples from a wide range of people is to ask people to provide them (e.g., provide a picture of his/her face together with a corresponding facial expression category label). People may be willing to provide images of their own faces if, after some kind of modification to these images, they are no longer recognizable from these modified images. That is, human subjects may prefer that these images are "anonymized." Such an anonymized image should preserve at least part of the emotional expression of the original facial image (i.e., information about facial expression) to be useful as an input to train an AFER system.

Therefore, there is a need for improved techniques to generate anonymized facial images.

SUMMARY OF THE INVENTION

The present invention overcomes the limitations of the prior art by perturbing recognizable facial images, in a manner such that the perturbed facial images are no longer recognizable while still preserving at least part of the emotional expression of the original facial image.

In one embodiment, an original facial image of a human subject is accessed. It is then perturbed to generate a synthesized facial image. The synthesized facial image is no longer recognizable as the human subject but still preserves at least part of the emotional expression of the original facial image. This can be used to generate training sets of facial images, for example to facilitate training of an automatic facial expression recognition system.

In one particular approach, the original facial image is encoded as a feature set. The feature set contains personal identity components that contribute to recognizability of the facial image and expression components that contribute to the emotional expression of the facial image. A perturbation transform is applied to the feature set. The perturbation transform substantially perturbs the personal identity components and substantially preserves at least some of the expression components. The perturbed feature set is decoded to obtain the synthesized facial image. In this way, the synthesized facial image is anonymized while still retaining some of the emotional expression of the original facial image.

In another aspect, a set of original facial images of human subjects is perturbed to generate a set of synthesized facial images. The number of facial images in the original set may be different than the number of facial images in the synthesized set. Each synthesized facial image is anonymized but preserves at least part of the emotional expression of the corresponding original facial image. However, expression elements in the set of original facial images are in the aggregate also present in the set of synthesized facial images.

Other aspects of the invention include methods, devices, systems, applications, variations and improvements related to the concepts described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
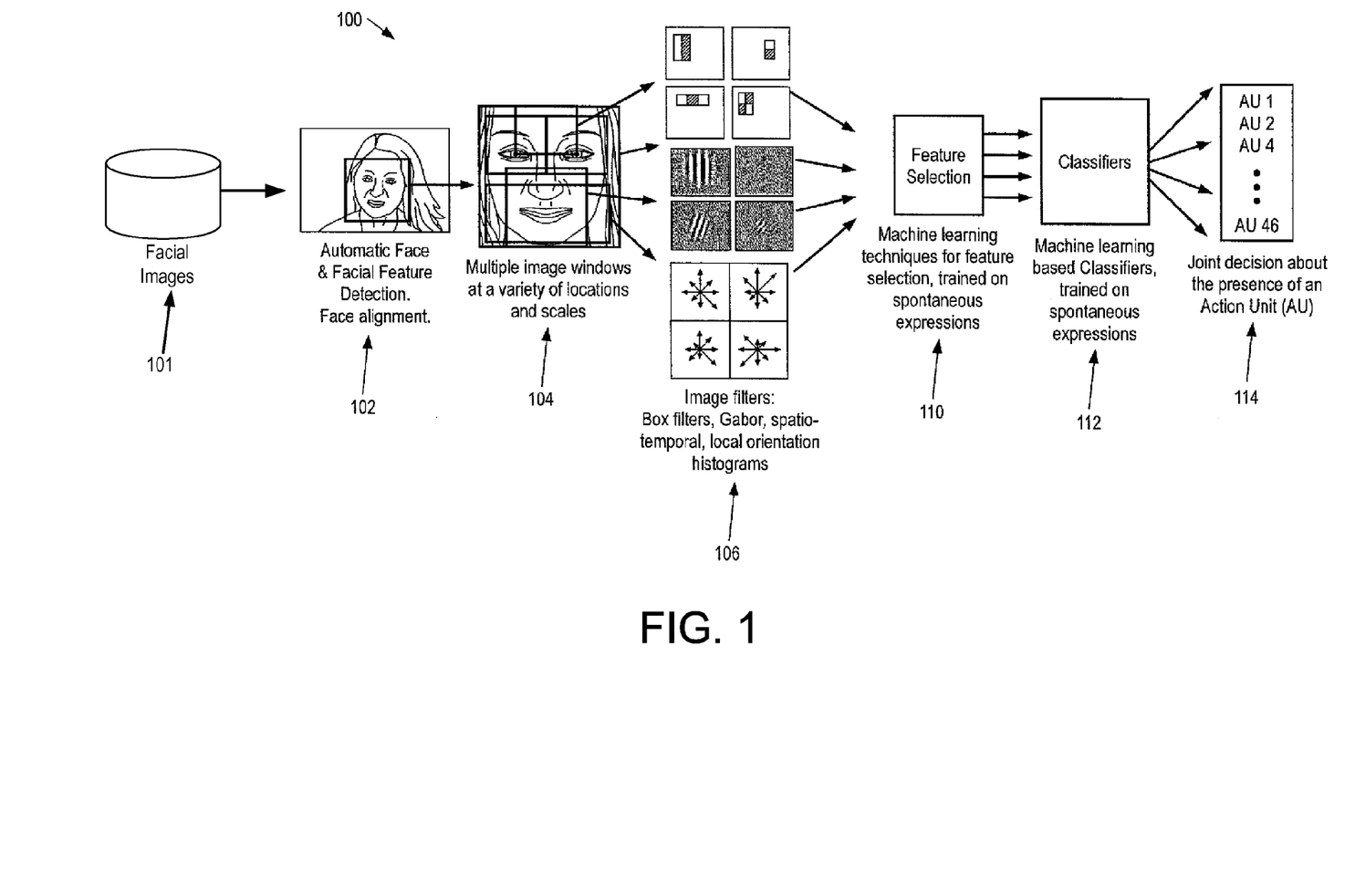
FIG. 1 is a block diagram illustrating a system for automatic facial expression recognition.

FIG. 1 is a block diagram illustrating a system for automatic facial action coding. Facial action coding is one system for assigning a set of numerical values to describe facial expression. The system in FIG. 1 receives facial images and produces the corresponding facial action codes. At 101 a source module provides a set of facial images. At 102, a face detection module automatically detects the location of a face within an image (or within a series of images such as a video), and a facial feature detection module automatically detects the location of facial features, for example the mouth, eyes, nose, etc. A face alignment module extracts the face from the image and aligns the face based on the detected facial features. In some cases, the above functions may be accomplished by the face detection module alone. For the purposes of this disclosure, an image can be any kind of data that represent a visual depiction of a subject, such as a person. For example, the term includes all kinds of digital image formats, including but not limited to any binary or other computer-readable data representation of a two-dimensional image.

After the face is extracted and aligned, at 104 a feature location module defines a collection of one or more windows at several locations of the face, and at different scales or sizes. At 106, one or more image filter modules apply various filters to the image windows to produce a set of characteristics representing contents of each image window. The specific image filter or filters used can be selected using machine learning methods from a general pool of image filters that can include but are not limited to Gabor filters, box filters (also called integral image filters or Haar filters), and local orientation statistics filters. In some variations, the image filters can include a combination of filters, each of which extracts different aspects of the image relevant to facial action recognition. The combination of filters can optionally include two or more of box filters (also known as integral image filters, or Haar wavelets), Gabor filters, motion detectors, spatio-temporal filters, and local orientation filters (e.g. SIFT, Levi-Weiss).

The image filter outputs are passed to a feature selection module at 110. The feature selection module, whose parameters are found using machine learning methods, can include the use of a machine learning technique that is trained on a database of spontaneous expressions by subjects that have been manually labeled for facial actions from the Facial Action Coding System (FACS). The feature selection module 110 processes the image filter outputs for each of the plurality of image windows to choose a subset of the characteristics or parameters to pass to the classification module at 112. The feature selection module results for the two or more image windows can optionally be combined and processed by a classifier process at 112 to produce a joint decision regarding the posterior probability of the presence of an action unit in the face shown in the image. The classifier process can utilize machine learning on the database of spontaneous facial expressions. At 114, a promoted output of the process 100 can be a score for each of the action units that quantifies the observed "content" of each of the action units in the face shown in the image.

In some implementations, the overall process 100 can use spatio-temporal modeling of the output of the frame-by-frame action units (AU) detectors. Spatio-temporal modeling includes, for example, hidden Markov models, conditional random fields, conditional Kalman filters, and temporal wavelet filters, such as temporal Gabor filters, on the frame-by-frame system outputs.

In one example, the automatically located faces can be rescaled, for example to 96×96 pixels. Other sizes are also possible for the rescaled image. In a 96×96 pixel image of a face, the typical distance between the centers of the eyes can in some cases be approximately 48 pixels. Automatic eye detection can be employed to align the eyes in each image before the image is passed through a bank of image filters (for example Gabor filters with 8 orientations and 9 spatial frequencies (2:32 pixels per cycle at ½ octave steps)). Output magnitudes can be passed to the feature selection module and facial action code classification module. Spatio-temporal Gabor filters can also be used as filters on the image windows.

In addition, in some implementations, the process can use spatio-temporal modeling for temporal segmentation and event spotting to define and extract facial expression events from the continuous signal (e.g., series of images forming a video), including onset, expression apex, and offset. Moreover, spatio-temporal modeling can be used for estimating the probability that a facial behavior occurred within a time window. Artifact removal can be used by predicting the effects of factors, such as head pose and blinks, and then removing these features from the signal.

FIG. 1 is just one example of a machine learning system. Other examples will be apparent. For example, see U.S. patent application Ser. No. 12/548,294, which is incorporated herein by reference in its entirety.

Figure 2:
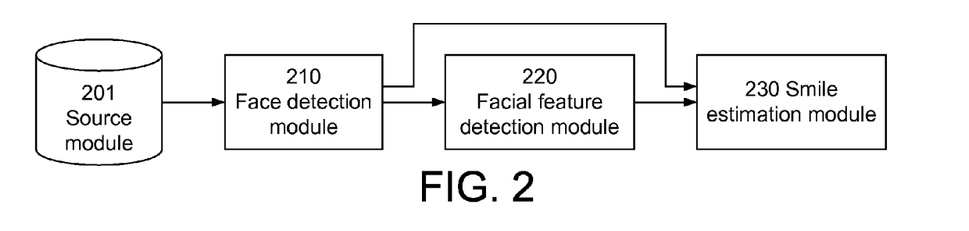
FIG. 2 is a block diagram illustrating a system for smile detection.

FIG. 2 shows a simpler system which will be used for purposes of illustration in this disclosure. FIG. 2 is a block diagram illustrating a system for smile detection. Other types of emotion detection could also be used. The smile detection system in FIG. 2 includes just four modules. A source module 201 provides facial images to the rest of the system. A face detection module 210 receives facial images as inputs and produces image patches of faces as output. A facial feature detection module 220 receives the image patches of faces as inputs and outputs the location of facial features (e.g., eyes, ears, nose, etc.) in those patches. A smile estimation module 230 receives both image patches from a face and the location of facial features as input and outputs an estimate of whether or not the input face has a smiling expression. Thus, the complete smile detection system depends on the joint operation of modules 210-230. Experimentation with a wide range of variations of these three different modules (i.e., training the modules) is desirable to produce a good smile detection system. A large number of facial images are often needed for successful training of the modules.

Figure 3A:
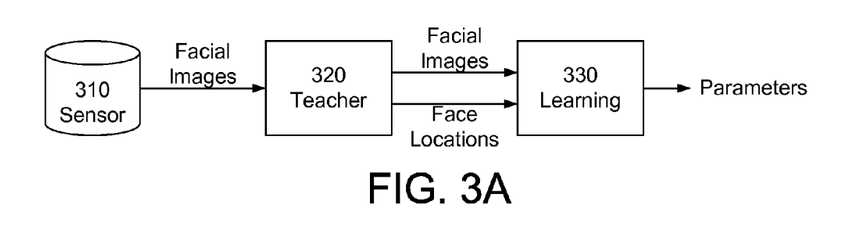
FIGS. 3A-C are block diagrams illustrating training of a module.
Figure 3B:
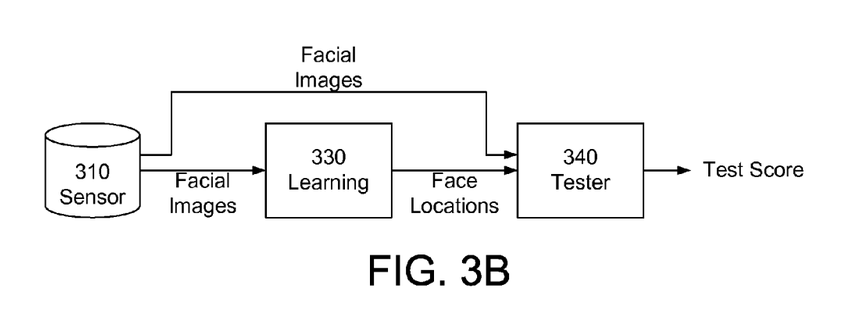
Figure 3C:
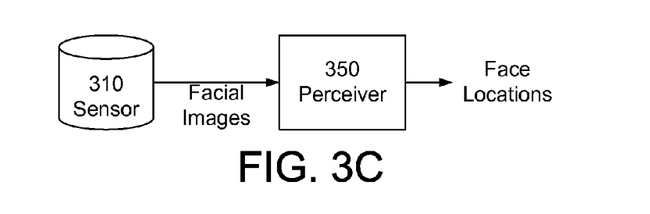

With respect to supervised machine learning systems, modules can often be classified according to the role played by that module: sensor, teacher, learner, tester and perceiver, for example. FIGS. 3A-C illustrate these roles, using the face detection module 210 from FIG. 2. The goal is to train the face detection module 210 to predict face locations from received facial images. FIG. 3A illustrates supervised learning through use of a training set. FIG. 3B illustrates testing to determine whether the supervised learning has been successful. FIG. 3C illustrates operation after learning is sufficiently completed.

Beginning with FIG. 3A, sensor modules provide initial data as input to other modules. In the example of FIG. 3, the sensor module 310 provides facial images. Teacher modules provide the supervised learning. They receive input data and provide the corresponding training outputs. In FIG. 3A, the teacher module 320 receives facial images from sensor module 310 and provides the "right answer," i.e., the face location for each facial image. The teacher module 320 may calculate the training output or it may obtain the training output from another source. For example, a human may have manually determined the face location for each facial image, and the teacher module 320 simply accesses a database to return the correct location for each facial image. The learning module 330 is the module being trained by the teacher module 320. In this case, the learning module 330 is learning to estimate face locations from facial images. In many cases, the learning module 330 includes a parameterized model of the task at hand, and the learning process uses the training set to adjust the values of the numerical parameters of the model. In some cases, including the example of FIG. 3A, the learning module 330 outputs the values for the numerical parameters.

In FIG. 3B, a tester module 340 determines how well the learning module 330 has been trained. The sensor module 310 provides facial images to the trained learning module 330, which outputs its estimate of face locations. The tester module 340 also receives the facial images and determines the correct face locations. It compares the correct face locations with those predicted by the learning module 330. In this way, it can determine how well the learning module 330 is performing. Many times, the teacher module 320 can also be used as the tester module 340.

Once the learning module 330 is trained, it can perform tasks on other input data, as shown in FIG. 3C. When used in this operational mode, the learning module 330 will be referred to as a perceiver module 350. The perceiver module 350 may not be identical to the learning module 330. For example, the perceiver module 350 may be stripped of any learning ability. In FIG. 3C, the sensor module 310 provides new facial images to the perceiver module 350, which then outputs the estimated face locations.

The construction, training, and operation of an automatic facial expression recognition (AFER) system, as illustrated by the examples of FIGS. 1-3, can be quite complex and often require a large number of facial images as input (the sensor module 310, for instance). Moreover, these facial images preferably are labeled by the teacher module 320 or equivalent before being used to train the learning module 330.

One way to obtain a large number of labeled facial images is to ask people to provide them. However, people may be reluctant to do so if their personal identities can be discerned from the facial images. Conversely, people may be willing to provide images of their own faces if, after some kind of modification to the facial images, their personality identities are no longer recognizable from the modified facial images, a procedure referred herein as anonymization. Such an anonymized facial image should preserve at least part of the emotional expression of the original facial image.

Figure 4:
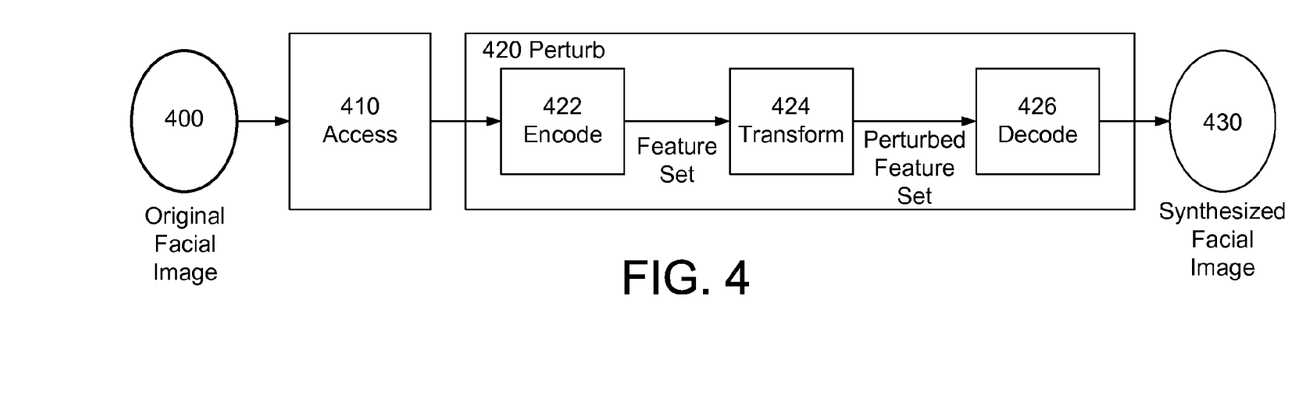
FIG. 4 is a block diagram illustrating an anonymization process.

FIG. 4 is a block diagram illustrating one approach to anonymizing the original facial image while preserving at least part of its emotional expression. An original facial image 400 of a human subject is provided. A module 410 accesses the original facial image 400. For example, module 410 may retrieve the facial images 400 from a database of facial images. The output of the access module 410 is then entered into a perturbation module 420 to generate a synthesized facial image 430. The synthesized facial image is anonymized such that it is no longer recognizable as the human subject, while preserving at least part of the emotional expression of the original facial image 400.

In this example, the perturbation module 420 includes an encoder module 422, a transform module 424, and a decoder module 426. The output of the access module 410 is input to the encoder module 422, which encodes the original facial image 400 as a feature set. The feature set is typically a higher level representation than the original facial image 400. The feature set includes personal identity components that contribute to recognizability of the facial image and expression components that contribute to the emotional expression of the facial image. These components may be express within the feature set. That is, certain features are expressly personal identity components and other features are expressly expression components. Alternately, these components may be inherently within the feature set. That is, certain combinations of features contribute to recognizability and other combinations contribute to emotional expression, but the combinations are not expressly identified and the features themselves are a mix of recognizability and emotional expression.

The feature set is input to the transform module 424, which applies a perturbation transform to the feature set that substantially perturbs its personal identity components but substantially preserves at least some of its expression components. The output of the transform module 424 is a perturbed feature set, which serves as an input to the decoder module 426. The decoder module 426 decodes the perturbed feature set to obtain the synthesized facial image 430. The synthesized facial image 430, which is now "anonymized," together with a facial expression category label of the original facial image 400 (e.g., happy, sad, etc.), can be used to train an AFER system.

One way to obtain an encoded feature set from a facial image is to project the facial image into its basis vectors, i.e., express the image as a superposition of all its basis-vector components: Image=$\Sigma_{i=1}^{N} c_i V_i$, where $V_i$ are the basis vectors and $c_i$ are the corresponding weights. $V_i$ can be basic features of a face. For example, $V_1$ can refer to the space between the eyes, $V_2$ can refer to the space between the mouth and nose, etc. In this example, the feature set (FS) is defined by the weights: FS=$(c_1, c_2, \ldots, c_N)$. Other approaches can also be used to obtain the feature set. For example, unsupervised learning methods can be used. Principal component analysis, independent component analysis and sparse coding are additional approaches. Feature sets can also be obtained through the use of filter banks, for example Gabor bandpass filters.

Figure 5:
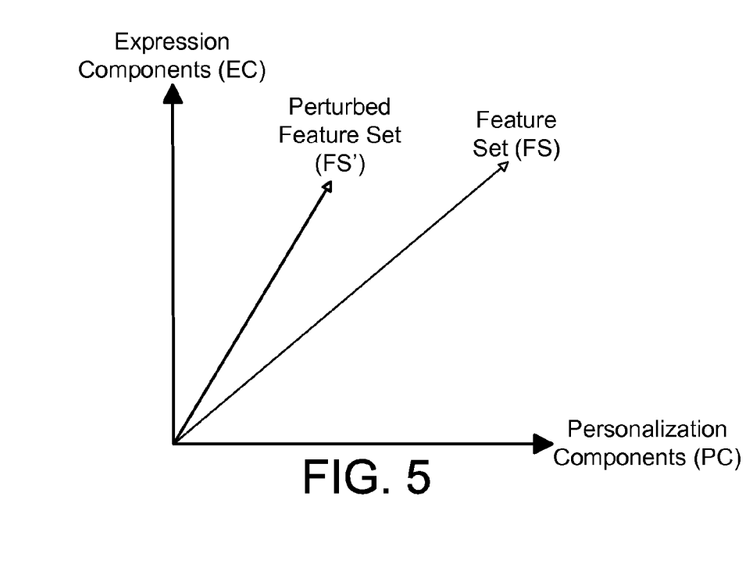
FIG. 5 is a plot illustrating the effect of the perturbation transform.

FIG. 5 illustrates the effect of the perturbation transform that is applied by the transform module 424. The feature set (FS) and the perturbed feature set (FS') are represented as two-dimensional vectors in a space spanned by personal identity components (PC, the horizontal axis) and expression components (EC, the vertical axis). Mathematically, FS and FS' can be written as a sum of their projections onto the PC and EC axes: FS=$A*\overrightarrow{PC}+B*\overrightarrow{EC}$ and FS'=$A'*\overrightarrow{PC}+B'*\overrightarrow{EC}$, where $\overrightarrow{PC}$ and $\overrightarrow{EC}$ are unit vectors along the PC and EC axes, respectively. The perturbation transform substantially decreases A (the personal identity components of FS) to A' (the personal identity components of FS'), A'<<A, so that after decoding, the synthesized facial image will not be recognizable as the human subject. In the meantime, the perturbation transform preserves a substantial part of B (the expression components of FS) as B' (the expression components of FS'), B≅B', so that after decoding the synthesized image will still have useful information for training an AFER system. While in FIG. 5 the PC and EC axes are drawn to be orthogonal to each other, it is for illustration purposes only. In practice the PC axis can be non-orthogonal to the EC axis. In addition, the PC and EC axes can each be multi-dimensional.

Different techniques can be used to implement the perturbation transform. For example, some values in the feature set may be set to zero. Noise may be added to values in the feature set. Values in the feature set may be permuted. The feature set may be linearly transformed. As a final example, a linear discriminant analysis may be applied to the feature set.

The quantities EC, PC, FS and FS' are shown as vectors in FIG. 5 for purposes of illustration. However, they can be quantified using the following approach. In many cases, for any given image, the information content about a categorical value for that image can be represented by the mutual information. For example, let X represent an original facial image, f(X) a synthesized facial image obtained from the original facial image X, and C a categorical value for either X or f(X). For instance, C can be the identity of the person shown in X (or f(X)), the type of facial expression of the person (e.g., happy, sad, etc.), the person's gender, the person's age, etc. The amount of information I, in bits, that the synthesized image f(X) provides about the categorical value C can be measured using the following formula:

$$I(f(X);C)=H(f(X))-H(f(X)|C), \tag{1}$$

where H(f(X)) is the unconditional Shannon entropy of f(X), H(f(X)|C) is the conditional Shannon entropy of f(X) given C, and I(f(X);C) is the mutual information. Both H(f(X)) and H(f(X)|C) can be estimated, for example, by collecting images with their corresponding categorical values and applying standard entropy estimation methods for continuous random vectors.

Alternatively, the amount of information in bits that the synthesized image f(X) provides about the categorical value C can be measured using the following formula:

$$I(f(X);C)=H(C)-H(C|f(X)), \tag{2}$$

where H(C) is the unconditional Shannon entropy of C and H(C|f(X)) is the conditional Shannon entropy of C given f(X). For example, H(C) can be computed based on the prior probabilities of the different categorical values that C can assume.

In the following examples, C is taken to be the facial expression of the person shown in f(X). H(C|f(X)) can be approximately obtained in at least two different ways. The first way is using people to guess the categorical value C based on f(X). For example, people may be asked to report which facial expression they see in the synthesized facial image f(X). Let R be the distribution of people's responses to the above question. Then H(C|f(X)) can be approximated by H(C|R), which can be computed since both C and R are discrete random variables. Another way is using computer vision systems to guess the categorical value C based on f(X). In this case, computer vision systems, instead of people, are asked to report the facial expression categorical value in the synthesized facial image f(X). Again let R be the distribution of responses from the computer vision systems to the above question. Similarly, H(C|f(X)) can also be approximated by H(C|R). The quantity H(C)-H(C|R) provides a lower bound approximation to H(C)-H(C|f(X)), the mutual information between f(X) and C.

Another way to get a lower bound approximation to the mutual information I(f(X);C) is to use percent correct on the task of classifying the categorical value C of f(X). This is due to the relationship between mutual information and percent correct of optimal classifiers. The percent correct may be measured using humans or automatic classification systems. For example, the proportion of times that humans correctly guess the gender of the person in the synthesized facial image f(X) provides an estimate of the amount of information that f(X) provides about the gender of the person shown in f(X).

In this disclosure, the main categorical values (C) of interest include personal identity (i.e., recognizability) and emotional expression. For recognizability, C may be an integer identifying the particular person rendered in a dataset of images. For emotional expression, C may be an integer representing the type of facial expression in the image (e.g., happy, sad, bored, surprised, etc.).

For example, let C represent the personal identity of a human subject from whom the synthesized facial image f(X) is derived. In one approach, the synthesized image is deemed to be no longer recognizable as the human subject when the mutual information between the personal identity and the synthesized facial image I(f(X);C) is sufficiently small, for example, when I(f(X);C) falls below a threshold value. In an alternate approach, the synthesized facial image is deemed to be no longer recognizable as the human subject when the probability that people can correctly identify the human subject from the synthesized facial image is no greater than a threshold value. For example, such a threshold value may be the probability of correctly identifying the human subject with pure random guessing.

Returning to FIG. 4, there are also various ways that the perturbed feature set can be decoded to obtain the synthesized facial image. For example, if the encoder module 422 in FIG. 4 implements an encoding approach with a well-defined inverse, then the inverse can be applied by the decoder module 426.

In cases where the inverse process is not so well defined, various approaches can be used, including different types of supervised learning. Support Vector Machine (SVM) regression and multilayer perceptron are two examples of the supervised machine learning methods that can be used for decoding. In some cases, the decoder module 426 is "optimal" in the sense that it performs the decoding which retains the most information from the original facial image. This could also retain the most information about personal identity. In other words, the synthesized facial image obtained via optimal decoding is the one that is most likely to be recognizable. Therefore, if the optimally decoded image is not recognizable as the human subject, then synthesized facial images obtained through suboptimal approaches also will not have sufficient information to be recognizable.

In one approach, the decoder module 426 is trained. The training set typically includes unrecognizable facial images (e.g., feature sets that are encoded by the encoder module 422) and their corresponding original facial images.

After decoding, the synthesized facial image should not contain enough information about personal identity to recognize the human subject. That is, the synthesized facial images should be anonymized. This can be verified using a variety of methods. For example, discriminant analysis and/or some off-the-shelf face recognition algorithms can be used. Examples of off-the-shelf face recognition algorithms include nearest neighbor discrimination applied to the output of Gabor filter banks, FaceIt Face Recognition software development kit (SDK) from Bayometric Inc., FaceVACS SDK from Cognitec, Betaface, BIOID, ACSYS face recognition system, Luxand, VeriLook Surveillance SDK, CrowdSight SDK from ThirdSight, etc. Additionally, one can use non-commercial face recognition systems, such as Face recognition using OpenCV (EigneFaces, FisherFaces, Local Binary Patterns), PhD toolbox for face recognition (PCA, LDA, kernal PCA, kernal LDA), InFace toolbox (e.g., illumination invariant face recognition), Face Recognition in Python, etc. Human crowdsourcing can also be used. People can be asked to attempt to match a supposedly anonymized facial image to a collection of original facial images. If the synthesized facial image was successfully anonymized, then all, or most, people will not be able to make the match. The human subject can also verify that he/she is no longer recognizable from the synthesized facial image, or that the human subject is satisfied with the degree of anonymization achieved. Any of the above methods, or combinations thereof, can be used to verify that the synthesized facial image is no longer recognizable as the human subject. The above list of verification methods is by no means exhaustive.

Figure 6:
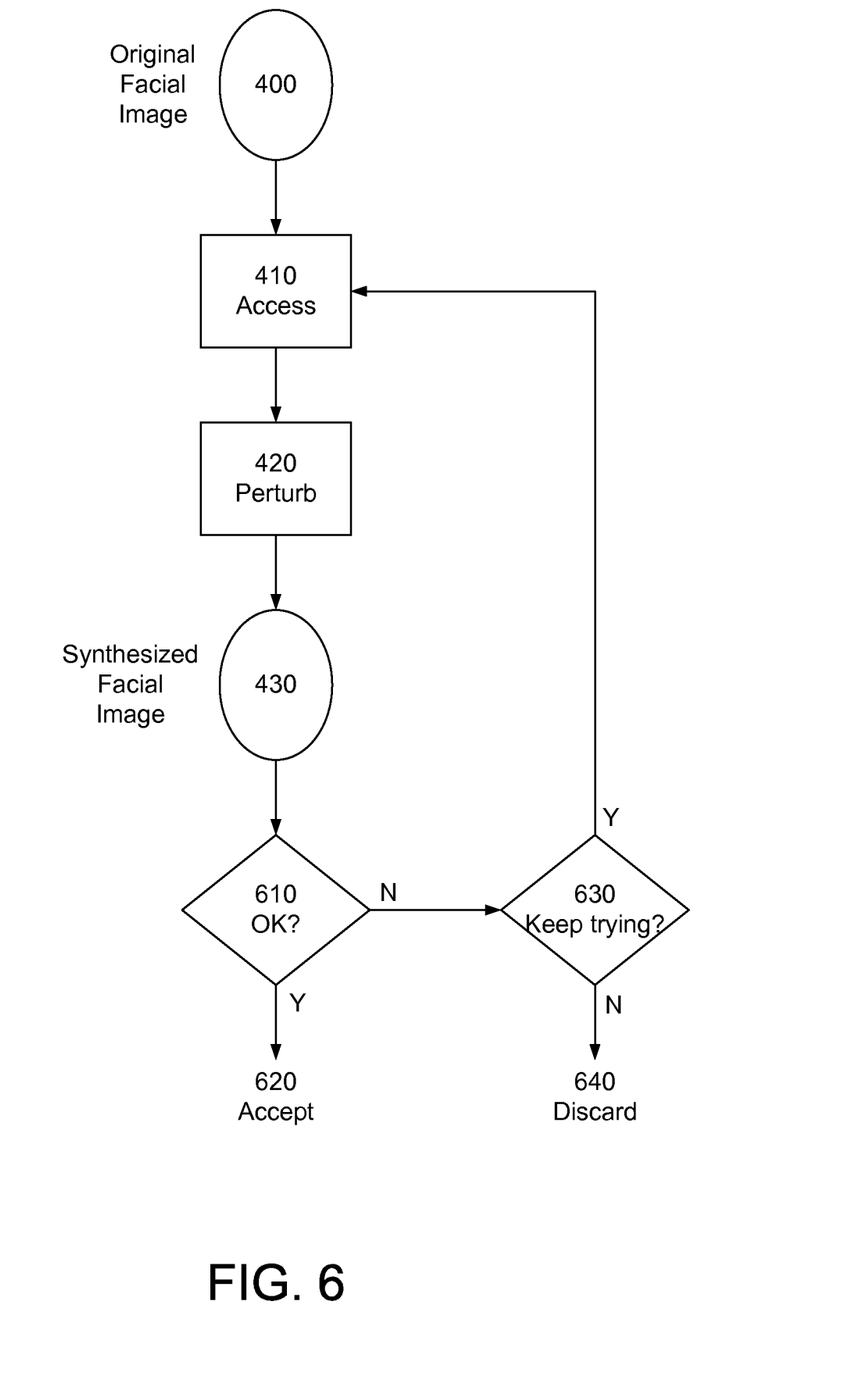
FIG. 6 is a flow chart illustrating subject approval of a synthesized facial image.

FIG. 6 is a flow chart illustrating subject approval of a synthesized facial image. As described above, an original facial image 400 is accessed 410 and then perturbed 420 to produce a synthesized facial image 430. The human subject can then verify 610 to his satisfaction that his personal identity is indeed not recognizable. In one approach, the synthesized facial image is shown to the subject. If satisfied 620, the subject accepts the synthesized facial image 430 as a successfully anonymized image. If unsatisfied 630, the subject has two choices. He can choose to discard 640 the synthesized facial image 430 and stop the anonymization attempt. Alternately, he can continue the anonymization process. For example, the synthesized facial image 430 may be sent back to the access module 410 to start another round of anonymization.

Figure 7A:
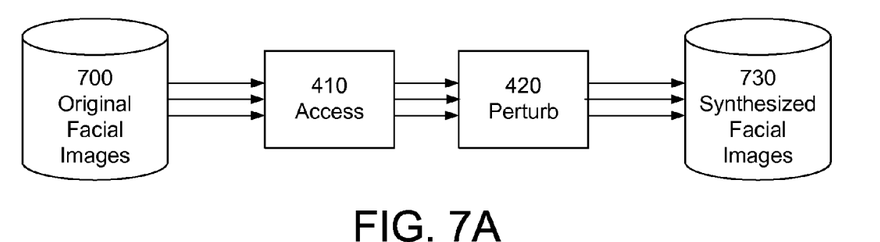
FIGS. 7A-C are block diagrams illustrating various ways to generate synthesized facial images.
Figure 7B:
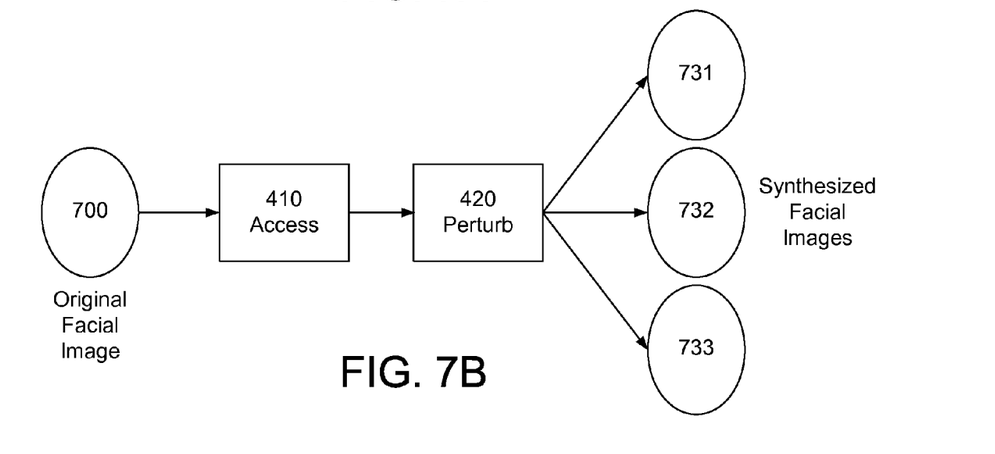
Figure 7C:
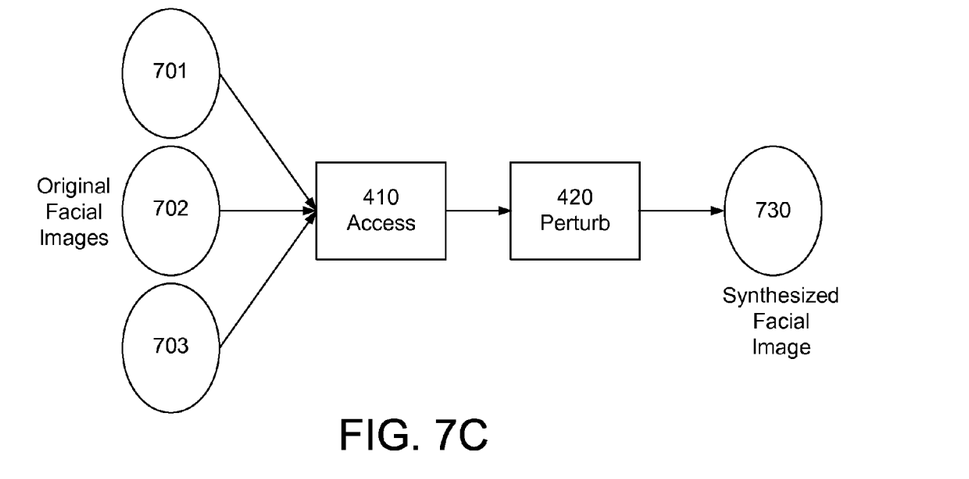

FIGS. 7A-C are block diagrams illustrating various ways to generate synthesized facial images. FIG. 7A shows a general case where a set of original facial images 700 are accessed 410 and perturbed 420 to produce a set of synthesized facial images 730. Each synthesized facial image is no longer recognizable as the human subject from the corresponding original facial image (i.e., it is anonymized), but still preserves at least part of the emotional expression of the corresponding original facial image. Note that in the example illustrated in FIG. 7A, the number of facial images in the original set 700 (denoted by an integer N) and the number of facial images in the synthesized set 730 (denoted by an integer M) can be different.

FIG. 7B illustrates the scenario where N=1 and M=3. That is, one original facial image 700 is used to create three synthesized facial images 731, 732, 733. For instance, the subject's eyes from the original facial image 700 may be combined with generic (or genericized) nose and mouth to create the synthesized facial image 731, the subject's nose from the original facial image 700 may be combined with generic eyes and mouth to create synthesized facial image 732, and the subject's mouth from the original facial image 400 may be combined with generic nose and eyes to create the synthesized facial image 733. In this example, each of the synthesized facial images contains less than all of the expression elements in the original facial image 700, but the group of synthesized facial images in the aggregate contains substantially all of the expression elements.

FIG. 7C illustrates the scenario where N=3 and M=1. In this example, three original facial images 701, 702, 703 are transformed into one synthesized facial image 730. For instance, the synthesized facial image 730 may have the eyes from face 701, the nose from face 702, and the mouth from face 703.

Eyes, nose and mouth were used in the above examples for purposes of illustration. In actual implementations, the combinations may be more subtle. Original facial images may be combined in a way that the synthesized facial images are not recognizable as the originals, and further that different face components in the synthesized facial images also are not recognizable as having come from the originals.

However, the information content of expression elements in the synthesized facial images in the aggregate is about the same as that in the original facial images. This can be formulated in the language of mutual information as:

$$\Sigma_{j=1}^{N} I(X_j;C) - \Sigma_{k=1}^{M} I(f_k(\{X_j\});C), \quad (3)$$

where C is a categorical value for emotional expression, $X_j$ (j=1, 2, ..., N) is the $j^{th}$ original facial image, $\{X_j\}$ is the entire set of original facial images, $f_k(\{X_j\})$ (k=1, 2, ..., M) is the $k^{th}$ synthesized facial image, $I(X_j;C)$ is the mutual information that $X_j$ provides about C (expression elements in $X_j$), and $I(f_k(\{X_j\});C)$ is the mutual information that $f_k(\{X_j\})$ provides about C (expression elements in $f_k(\{X_j\})$). $f_k(\{X_j\})$ stands for the $k^{th}$ synthesized facial image which is obtained from perturbing the entire set of original facial images $\{X_j\}$.

Take the case of N=1 as an example. FIG. 7B illustrates a simplified version of the example where M=3. In general, there can be an arbitrary number of synthesized facial images (M>1) by perturbing the one original facial image in M different ways. Each synthesized facial image contains less than all of the expression elements in the original facial image, but the group of M synthesized facial images in the aggregate contains substantially all of the expression elements in the original facial image.

There are various ways to generate a group of M (M>1) synthesized facial images from one original facial image. For example, different synthesized facial images from the group may be based on different spatial regions from the original facial image. Alternatively, different synthesized facial images from the group may be based on different facial features from the original facial image. In another example, different synthesized facial images from the group may be based on different spatial frequency bands from the original facial image. In the last example, the different spatial frequency bands may refer to the 0 to 2 cycles per face frequency band, the 2 to 4 cycles per face frequency band, the 4 to 6 cycles per face frequency band, and so on. Each of the synthesized facial images may result from perturbing a particular frequency band while leaving other frequency bands intact. The expression elements in the original facial image are preserved in the group of synthesized facial images in the aggregate across all frequency bands.

Figure 8:
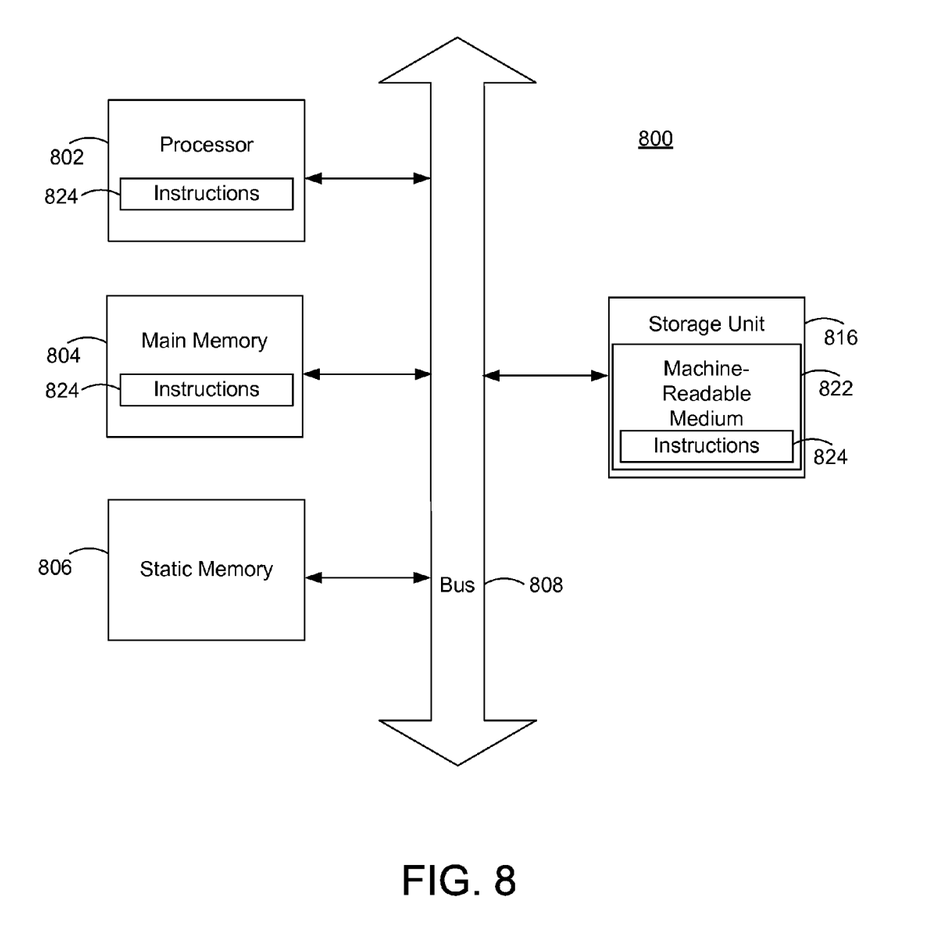
FIG. 8 illustrates one embodiment of components of an example machine able to read instructions from a machine-readable medium and execute them in a processor (or controller).

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800 within which instructions 824 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes a processor 802 (e.g., a central processing unit (CPU), a graphics processing unit (GPU), a digital signal processor (DSP), one or more application specific integrated circuits (ASICs)), a main memory 804, a static memory 806, and a storage unit 816 which are configured to communicate with each other via a bus 808. The storage unit 816 includes a machine-readable medium 822 on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution thereof by the computer system 800, the main memory 804 and the processor 802 also constituting machine-readable media.

While machine-readable medium 822 is shown in an example embodiment to be a single medium, the term "machine-readable medium" should be taken to include a single medium or multiple media (e.g., a centralized or distributed database, or associated caches and servers) able to store instructions (e.g., instructions 824). The term "machine-readable medium" shall also be taken to include any medium that is capable of storing instructions (e.g., instructions 824) for execution by the machine and that cause the machine to perform any one or more of the methodologies disclosed herein. The term "machine-readable medium" includes, but is not limited to, data repositories in the form of solid-state memories, optical media, and magnetic media.

The term "module" is not meant to be limited to a specific physical form. Depending on the specific application, modules can be implemented as hardware, firmware, software, and/or combinations of these, although in these embodiments they are most likely software. Furthermore, different modules can share common components or even be implemented by the same components. There may or may not be a clear boundary between different modules.

Depending on the form of the modules, the "coupling" between modules may also take different forms. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

Although the detailed description contains many specifics, these should not be construed as limiting the scope of the invention but merely as illustrating different examples and aspects of the invention. It should be appreciated that the scope of the invention includes other embodiments not discussed in detail above. For example, there are variations in the way that mutual information could be estimated. This includes measures of fit, such as sum of squared errors, percent correct, etc. There are different algorithms to measure how much information about the emotional expression or recognizability of a facial image is preserved. For example, manual and/or automatic coding of facial expressions in terms of FACS can be used to quantify the amount of information about the emotional expression preserved by the anonymization process. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A computer-implemented method for generating synthesized facial images, the method comprising:
accessing an original facial image of a human subject; and
perturbing the original facial image to generate a synthesized facial image, the synthesized facial image no longer recognizable as the human subject but preserving at least part of the emotional expression of the original facial image;
wherein the synthesized facial image is no longer recognizable as the human subject when a probability that humans can correctly identify the human subject from the synthesized facial image is no greater than a threshold.

2. A computer-implemented method for generating synthesized facial images, the method comprising:
accessing an original facial image of a human subject; and
perturbing the original facial image to generate a synthesized facial image, the synthesized facial image no longer recognizable as the human subject but preserving at least part of the emotional expression of the original facial image;
wherein the step of perturbing the original facial image comprises:
encoding the original facial image as a feature set, the feature set containing personal identity components and expression components, the personal identity components contributing to recognizability of the facial image and the expression components contributing to the emotional expression of the facial image;
applying a perturbation transform to the feature set, wherein the perturbation transform substantially perturbs the personal identity components and substantially preserves at least some of the expression components; and
decoding the perturbed feature set to obtain the synthesized facial image.

3. The method of claim 2 wherein the step of encoding the original facial image as a feature set uses unsupervised learning.

4. The method of claim 2 wherein the step of encoding the original facial image as a feature set uses principal component analysis.

5. The method of claim 2 wherein the step of encoding the original facial image as a feature set uses independent component analysis.

6. The method of claim 2 wherein the step of encoding the original facial image as a feature set uses sparse coding.

7. The method of claim 2 wherein the step of encoding the original facial image as a feature set uses filter banks.

8. The method of claim 2 wherein the step of encoding the original facial image as a feature set uses Gabor bandpass filters.

9. The method of claim 2 wherein the step of applying a perturbation transform to the feature set comprises setting some values in the feature set to zero.

10. The method of claim 2 wherein the step of applying a perturbation transform to the feature set comprises adding noise to the feature set.

11. The method of claim 2 wherein the step of applying a perturbation transform to the feature set comprises permuting some values in the feature set.

12. The method of claim 2 wherein the step of applying a perturbation transform to the feature set comprises applying a linear transform to some values in the feature set.

13. The method of claim 2 wherein the step of applying a perturbation transform to the feature set comprises applying a linear discriminant analysis to the feature set.

14. The method of claim 2 wherein the step of decoding the perturbed feature set uses supervised learning.

15. The method of claim 14 wherein the supervised learning uses a training set that includes unrecognizable facial images and their corresponding original facial images.

16. The method of claim 2 wherein the step of decoding the perturbed feature set uses SVM regression.

17. The method of claim 2 wherein the step of decoding the perturbed feature set uses multilayer perceptron.

18. The method of claim 2 further comprising:
confirming that the synthesized facial image is no longer recognizable as the human subject.

19. The method of claim 18 wherein the confirming step uses a recognition algorithm to confirm that the synthesized facial image is no longer recognizable as the human subject.

20. The method of claim 18 wherein the confirming step uses discriminant analysis to confirm that the synthesized facial image is no longer recognizable as the human subject.

21. The method of claim 18 wherein the confirming step uses human crowdsourcing to confirm that the synthesized facial image is no longer recognizable as the human subject.

22. The method of claim 2 further comprising:
receiving an indication from the human subject whether the synthesized facial image is acceptable to the human subject as no longer recognizable as the human subject.

23. A computer-implemented method for generating synthesized facial images, the method comprising:
accessing an original facial image of a human subject; and
perturbing the original facial image to generate a synthesized facial image, the synthesized facial image no longer recognizable as the human subject but preserving at least part of the emotional expression of the original facial image,
wherein expression elements in the set of original facial images are in aggregate also present in the set of synthesized facial images and the step of perturbing the original facial images comprises:
perturbing an original facial image in at least M ways to generate a group of M synthesized facial images from the original facial image, M>1, wherein each synthesized facial image contains less than all of the expression elements in the original facial image but the group of synthesized facial images in the aggregate contains substantially all of the expression elements in the original facial image.

24. The method of claim 23 wherein different synthesized facial images from the group are based on different spatial regions from the original facial image.

25. The method of claim 23 wherein different synthesized facial images from the group are based on different facial features from the original facial image.

26. The method of claim 23 wherein different synthesized facial images from the group are based on different spatial frequency bands from the original facial image.

27. A non-transitory tangible computer readable medium containing instructions that, when executed by a processor, execute a method for generating synthesized facial images, the method comprising:
accessing an original facial image of a human subject; and
perturbing the original facial image to generate a synthesized facial image, the synthesized facial image no longer recognizable as the human subject but preserving at least part of the emotional expression of the original facial image,
wherein the step of perturbing the original facial image comprises:
encoding the original facial image as a feature set, the feature set containing personal identity components and expression components, the personal identity components contributing to recognizability of the facial image and the expression components contributing to the emotional expression of the facial image;
applying a perturbation transform to the feature set, wherein the perturbation transform substantially perturbs the personal identity components and substantially preserves at least some of the expression components; and
decoding the perturbed feature set to obtain the synthesized facial image.

28. The computer readable medium of claim 27 wherein the step of encoding the original facial image as a feature set uses unsupervised learning.

29. The computer readable medium of claim 27 wherein the step of encoding the original facial image as a feature set uses principal component analysis.

30. The computer readable medium of claim 27 wherein the step of encoding the original facial image as a feature set uses independent component analysis.

31. The computer readable medium of claim 27 wherein the step of encoding the original facial image as a feature set uses sparse coding.

32. The computer readable medium of claim 27 wherein the step of encoding the original facial image as a feature set uses filter banks.

33. The computer readable medium of claim 27 wherein the step of encoding the original facial image as a feature set uses Gabor bandpass filters.

34. The computer readable medium of claim 27 wherein the step of applying a perturbation transform to the feature set comprises setting some values in the feature set to zero.

35. The computer readable medium of claim 27 wherein the step of applying a perturbation transform to the feature set comprises adding noise to the feature set.

36. The computer readable medium of claim 27 wherein the step of applying a perturbation transform to the feature set comprises permuting some values in the feature set.

37. The computer readable medium of claim 27 wherein the step of applying a perturbation transform to the feature set comprises applying a linear transform to some values in the feature set.

38. The computer readable medium of claim 27 wherein the step of applying a perturbation transform to the feature set comprises applying a linear discriminant analysis to the feature set.

39. The computer readable medium of claim 27 wherein the step of decoding the perturbed feature set uses supervised learning.

40. The computer readable medium of claim 39 wherein the supervised learning uses a training set that includes unrecognizable facial images and their corresponding original facial images.

41. The computer readable medium of claim 27 wherein the step of decoding the perturbed feature set uses SVM regression.

42. The computer readable medium of claim 27 wherein the step of decoding the perturbed feature set uses multilayer perceptron.

43. The computer readable medium of claim 27 further comprising:
confirming that the synthesized facial image is no longer recognizable as the human subject.

44. The computer readable medium of claim 43 wherein the confirming step uses a recognition algorithm to confirm that the synthesized facial image is no longer recognizable as the human subject.

45. The computer readable medium of claim 43 wherein the confirming step uses discriminant analysis to confirm that the synthesized facial image is no longer recognizable as the human subject.

46. The computer readable medium of claim 43 wherein the confirming step uses human crowdsourcing to confirm that the synthesized facial image is no longer recognizable as the human subject.

47. The computer readable medium of claim 27 further comprising:
receiving an indication from the human subject whether the synthesized facial image is acceptable to the human subject as no longer recognizable as the human subject.

48. A system for generating synthesized facial images, the system comprising:
an encoder that encodes the original facial image as a feature set, the feature set containing personal identity components and expression components, the personal identity components contributing to recognizability of the facial image and the expression components contributing to the emotional expression of the facial image;
a perturbation engine coupled to the encoder, that applies a perturbation transform to the feature set, wherein the perturbation transform substantially perturbs the personal identity components and substantially preserves at least some of the expression components; and
a decoder coupled to the perturbation engine, that decodes the perturbed feature set to obtain the synthesized facial image.

49. A non-transitory tangible computer readable medium containing instructions that, when executed by a processor, execute a method for generating synthesized facial images, the method comprising:
accessing an original facial image of a human subject; and
perturbing the original facial image to generate a synthesized facial image, the synthesized facial image no longer recognizable as the human subject but preserving at least part of the emotional expression of the original facial image;
wherein expression elements in the set of original facial images are in aggregate also present in the set of synthesized facial images and the step of perturbing the original facial images comprises:
perturbing an original facial image in at least M ways to generate a group of M synthesized facial images from the original facial image, M>1, wherein each synthesized facial image contains less than all of the expression elements in the original facial image but the group of synthesized facial images in the aggregate contains substantially all of the expression elements in the original facial image.

50. The computer readable medium of claim 49 wherein different synthesized facial images from the group are based on different spatial regions from the original facial image.

51. The computer readable medium of claim 49 wherein different synthesized facial images from the group are based on different facial features from the original facial image.

52. The computer readable medium of claim 49 wherein different synthesized facial images from the group are based on different spatial frequency bands from the original facial image.

* * * * *